US010749915B2

(12) United States Patent
Mankoff (10) Patent No.: US 10,749,915 B2
(45) Date of Patent: Aug. 18, 2020

(54) MODIFYING SIGNAL ASSOCIATIONS IN COMPLEX COMPUTING NETWORKS

(71) Applicant: Jeffrey W. Mankoff, Dallas, TX (US)

(72) Inventor: Jeffrey W. Mankoff, Dallas, TX (US)

( * ) Notice: Subject to any disclaimer, the term of this patent is extended or adjusted under 35 U.S.C. 154(b) by 0 days.

(21) Appl. No.: 16/278,090

(22) Filed: Feb. 16, 2019

(65) Prior Publication Data
US 2019/0190964 A1   Jun. 20, 2019

Related U.S. Application Data

(63) Continuation of application No. 15/147,884, filed on May 5, 2016, now Pat. No. 10,341,395, and a continuation-in-part of application No. 15/076,876, filed on Mar. 22, 2016, now abandoned, which is a continuation-in-part of application No. 14/794,593, filed on Jul. 8, 2015, now abandoned, which is a continuation-in-part of application No. 13/937,132, filed on Jul. 8, 2013, now abandoned, which is a continuation of application No. 13/708,814, filed on Dec. 7, 2012, now Pat. No. 8,484,078, said application No. 15/147,884 is a continuation-in-part of application No. 13/231,946, filed on Sep. 13, 2011, now abandoned.

(60) Provisional application No. 61/568,637, filed on Dec. 8, 2011, provisional application No. 61/382,464, filed on Sep. 13, 2010.

(51) Int. Cl.
*G06F 15/16* (2006.01)
*H04L 29/06* (2006.01)
*G06N 20/00* (2019.01)

(52) U.S. Cl.
CPC ......... *H04L 65/1073* (2013.01); *G06N 20/00* (2019.01)

(58) Field of Classification Search
CPC .................................................. G06Q 30/0239
USPC ........................................................ 709/219
See application file for complete search history.

(56) References Cited

U.S. PATENT DOCUMENTS

| | | | |
|---|---|---|---|
| 7,403,907 | B1 | 7/2008 | Gerken, III et al. |
| 8,011,577 | B2 | 9/2011 | Mullen et al. |
| 8,290,858 | B1 | 10/2012 | Ankarath |
| 8,380,177 | B2 | 2/2013 | Laracey |
| 2004/0128241 | A1 | 7/2004 | Akama |
| 2004/0260605 | A1 | 12/2004 | McIntyre et al. |
| 2005/0021401 | A1 | 1/2005 | Postrel |
| 2005/0182648 | A1 | 8/2005 | Shaw et al. |
| 2006/0020542 | A1 | 1/2006 | Litle et al. |
| 2006/0271462 | A1 | 11/2006 | Harmon |
| 2007/0022048 | A1 | 1/2007 | Kingsborough et al. |

(Continued)

FOREIGN PATENT DOCUMENTS

| | | |
|---|---|---|
| KR | 10-2007-0092773 A | 9/2007 |
| KR | 10-2009-0038744 A | 4/2009 |

OTHER PUBLICATIONS

International Search Report and Written Opinion dated Mar. 29, 2013 in connection with International Application No. PCT/US2012/068601, 9 pages.

(Continued)

*Primary Examiner* — Hamza N Algibhah
(74) *Attorney, Agent, or Firm* — Baker & McKenzie LLP (57) ABSTRACT

This disclosure is directed to an apparatus for modifying a temporal signal association in a complex computing network such that a future computing operation is executed based on the modified signal association.

20 Claims, 4 Drawing Sheets

(56) References Cited

U.S. PATENT DOCUMENTS

| | | |
|---|---|---|
| 2007/0168266 A1 | 7/2007 | Questembert |
| 2008/0059379 A1 | 3/2008 | Ramaci et al. |
| 2008/0071587 A1 | 3/2008 | Granucci et al. |
| 2008/0189188 A1 | 8/2008 | Morgenstern |
| 2008/0207203 A1 | 8/2008 | Arthur et al. |
| 2009/0086693 A1 | 4/2009 | Kennedy |
| 2009/0094134 A1 | 4/2009 | Toomer et al. |
| 2009/0119174 A1 | 5/2009 | Pfister |
| 2009/0159690 A1 | 6/2009 | Mullen et al. |
| 2009/0159698 A1 | 6/2009 | Mullen et al. |
| 2009/0287562 A1 | 11/2009 | Bosch et al. |
| 2010/0010918 A1 | 1/2010 | Hunt |
| 2010/0106570 A1 | 4/2010 | Radu et al. |
| 2010/0114731 A1 | 5/2010 | Kingston et al. |
| 2010/0121764 A1 | 5/2010 | Niedermeyer |
| 2010/0245186 A1 | 9/2010 | Kojima |
| 2010/0257040 A1 | 10/2010 | Hunt |
| 2011/0087530 A1 | 4/2011 | Fordyce, III et al. |
| 2011/0106698 A1 | 5/2011 | Isaacson et al. |
| 2011/0208576 A1 | 8/2011 | Durgin et al. |
| 2011/0246284 A1* | 10/2011 | Chaikin ............... G06Q 20/105 705/14.38 |
| 2011/0288923 A1 | 11/2011 | Steinert et al. |
| 2011/0295719 A1 | 12/2011 | Chen et al. |
| 2011/0302083 A1* | 12/2011 | Bhinder ............... G06Q 20/32 705/44 |
| 2011/0313918 A1 | 12/2011 | Lawson et al. |
| 2012/0029997 A1 | 2/2012 | Khan et al. |
| 2012/0066093 A1 | 3/2012 | Carpenter |
| 2013/0080239 A1 | 3/2013 | Okerlund |
| 2013/0117094 A1 | 5/2013 | Jones et al. |
| 2013/0117126 A1 | 5/2013 | Coppinger |
| 2014/0172574 A1 | 6/2014 | Iriyama |
| 2014/0236696 A1 | 8/2014 | Robinson, Jr. et al. |
| 2015/0088753 A1* | 3/2015 | Van Der Schueren ............... G06Q 20/351 705/67 |
| 2015/0154587 A1* | 6/2015 | Chetty ............... G06Q 20/342 705/16 |
| 2015/0178701 A1* | 6/2015 | Glass ............... G06Q 20/18 705/14.27 |
| 2015/0371254 A1 | 12/2015 | Pugh et al. |
| 2016/0140526 A1* | 5/2016 | Cummins ............... G06Q 20/203 705/28 |
| 2016/0180368 A1 | 6/2016 | Booth |
| 2016/0225008 A1 | 8/2016 | Song et al. |
| 2016/0275537 A1* | 9/2016 | Yamano ............... G06Q 30/0208 |
| 2016/0343018 A1 | 11/2016 | Balk |
| 2017/0103408 A1* | 4/2017 | Mazuera ............... G06Q 30/0225 |
| 2018/0268434 A1* | 9/2018 | Watase ............... G06Q 30/02 |

OTHER PUBLICATIONS

PRNewswire, "Peppercoin Unveils Small Payments Loyalty Platform", Peppercoin, Inc., Waltham, Massachusetts, Jun. 12, 2006, 3 pages.

Definition of "register", downloaded May 11, 2013 from http://www.merriam-webster.com/thesaurus/register[verb], 1 page.

International Search Report and Written Opinion dated May 8, 2013 in connection with International Application No. PCT/US2011/051477, 9 pages.

Colleen Taylor, "Meet Giftly: A gift card company with actual tech cred", http://gigaom.com/2011/10/30/giftly/, Oct. 30, 2011, 2 pages.

U.S. Appl. No. 15/147,884, dated Aug. 9, 2019, 125 pages.
U.S. Appl. No. 13/231,946, dated Aug. 9, 2019, 321 pages.
U.S. Appl. No. 15/076,876, dated Aug. 9, 2019, 166 pages.
U.S. Appl. No. 14/794,593, dated Aug. 9, 2019, 156 pages.
U.S. Appl. No. 13/937,132, dated Aug. 9, 2019, 189 pages.
U.S. Appl. No. 13/708,814 dated Aug. 9, 2019, 277 pages.
PCI Security Standards Council, "Information Supplement: PCI DSS Tokenization Guidelines", Aug. 2011, 23 pages.

* cited by examiner

MODIFYING SIGNAL ASSOCIATIONS IN COMPLEX COMPUTING NETWORKS

TECHNICAL FIELD

This disclosure is directed to modifying temporal signal associations in complex computing networks.

BACKGROUND

There is a need for seamlessly changing a temporal association of a signal in a complex computing network, and there is a need for intelligent computing operation execution based on modified signal association.

BRIEF SUMMARY

In some embodiments, an apparatus is provided for modifying a temporal signal association in a complex computing network such that a future computing operation is intelligently executed based on the modified signal association. The apparatus may perform the functions of: determining association of a movable matching signal with a first signal; receiving registration of a second signal with the signal matching server; in response to receiving the registration of the second signal with the signal matching server, disassociating the matching signal from the first signal and associating the matching signal to the second signal, wherein: a computing operation is executed using the second signal; in response to determining the computing operation executed using the second signal, a determination is made whether a matching signal is associated with the second signal; and in response to determining the matching signal is associated with the second signal, the computing operation is executed based on at least one of the matching signal and the second signal.

In some embodiments, a computing operation is executed using the first signal; in response to determining the computing operation executed using the first signal, a determination is made whether a matching signal is associated with the first signal; and in response to determining the matching signal is not associated with the first signal, the computing operation is executed based on the first signal.

In some embodiments, notification of the matching signal is transmitted from a computing system associated with the first signal to a computing system associated with the second signal.

In some embodiments, in response to determining the computing operation is executed based on the matching signal and the second signal, transmitting a provisioning signal to a system associated with the first signal or associating the provisioning signal with the first signal.

In some embodiments, the provisioning signal comprises a second movable matching signal.

In some embodiments, the first signal or the second signal comprises an identification signal.

In some embodiments, the first signal or the second signal is at least one of not movable and not temporal.

In some embodiments, the computing operation is a real-time computing operation conducted at an input signal system comprising a real-time sensor.

In some embodiments, the matching signal is associated with a specific resource, and wherein a determination is made, at the input signal system, whether a signal associated with the specific resource matches the matching signal.

In some embodiments, the computing operation is executed based on the matching signal and the second signal if the signal associated with the specific resource matches the matching signal.

In some embodiments, the computing operation is executed based on the second signal, and not the matching signal if the signal associated with the specific resource does not match the matching signal.

In some embodiments, the first signal and the second signal are registered with a signal matching server.

In some embodiments, the matching signal is disassociated from the second signal upon execution of the computing operation in response to determining an attribute associated with the matching signal is extinguished.

In some embodiments, prior to the registration of the second signal with the signal matching server, the matching signal is pre-associated with the second signal.

In some embodiments, notification of the pre-association is communicated to a computing system associated with the second signal.

In some embodiments, the apparatus is further for determining whether the second signal is registered with the signal matching server; and in response to determining the second signal is not registered with the signal matching server, receiving registration of the second signal to the signal matching server.

In some embodiments, the computing operation affects an attribute of at least one of the matching signal and the second signal.

In some embodiments, the computing operation affects an attribute of the first signal.

In some embodiments, an apparatus is provided for real-time routing of an input signal received from a real-time sensor to perform disparate computing operations in a complex computing network, wherein but for the real-time routing of the input signal, which are necessarily rooted in computing technology, separate input signals would be needed for performing the disparate computing operations. The apparatus comprises a signal communication interface for: establishing a first connection to an input signal system, wherein the input signal system comprises a real-time sensor for sensing an input signal and transmitting the input signal on a first connection and a second connection, wherein the input signal comprises an identification signal (or is associated with the identification signal or is associated with a separately transmitted identification signal), wherein the input signal transmitted on the first connection is used for executing a first computing operation, and wherein the input signal transmitted on the second connection is used for executing a second computing operation; receiving the input signal and/or the identification signal on the first connection; establishing a third connection to an identification database; and accessing, on the third connection, records in the identification database.

In some embodiments, the apparatus further comprises a gateway processor for executing the first computing operation, the first computing operation comprising comparing the identification signal associated with the input signal to a record in the identification database; determining whether the identification signal matches a record in the identification database; in response to determining the identification signal does not match a record in the identification database, transmitting to the input signal system, a request for creating a record for the identification signal in the identification database; and in response to transmitting the request for creating a record for the identification signal in the identification database, receiving a second signal from the input signal system or the real-time sensor, the second signal comprising a response to the request for creating a record for the identification signal in the identification database, wherein the input signal transmitted on the second connection is received by an operations processor that executes the second computing operation.

In some embodiments, the transmission, to the input signal system or the real-time sensor, of the request for creating a record for the identification signal in the identification database is further based on a location of the real-time sensor.

In some embodiments, the transmission, to the input signal system or the real-time sensor, of the request for creating a record for the identification signal in the identification database is further based on an attribute of the second computing operation.

In some embodiments, the signal communication interface is further used for establishing a fourth connection to a programming processor, wherein the programming processor transmits a trigger signal that causes sensing of the input signal at the real-time sensor.

In some embodiments, the apparatus further comprises an application programming interface for communicating with the programming processor.

In some embodiments, the input signal is received from a computing device.

In some embodiments, the input signal is received from a mobile computing device.

In some embodiments, the input signal is received from a mobile non-computing device.

In some embodiments, an apparatus is provided for modifying a temporal data association in a complex computing network such that a computing operation is executed based on the modified data association. The apparatus performs the functions of: determining association of movable operation data with first data; determining registration of second data with a data operation server; in response to determining the registration of the second data with the data operation server, disassociating the movable operation data from the first data and associating the movable operation data with the second data, wherein: a computing operation is initiated using the second data; in response to determining the computing operation is initiated using the second data, a determination is made whether operation data is associated with the second data; and in response to determining the movable operation data is associated with the second data, the computing operation is executed based on the movable operation data and/or the second data, wherein, upon execution of the computing operation, the movable operation data is disassociated from the second data, or rendered inoperable for a future computing operation, based on determining an attribute associated with the movable operation data is extinguished, wherein the computing operation is a substantially real-time computing operation initiated at an input data system comprising a substantially real-time sensor, wherein: a second computing operation is initiated using the first data, in response to determining the second computing operation is initiated using the first data, a determination is made whether operation data is associated with the first data, and in response to determining the movable operation data is not associated with the first data, the second computing operation is executed based on the first data, and not based on the movable operation data, wherein the second computing operation is a second substantially real-time computing operation initiated at a second input data system comprising a second substantially real-time sensor, and wherein the first data and the second data are storable.

In some embodiments, an apparatus is provided for associating or disassociating signals associated with execution of substantially real-time computing operations in a complex computing network. The apparatus is configured or operable for: determining a first substantially real-time computing operation initiated, based at least partially on a first signal, at a first input signal system comprising a first substantially real-time sensor; in response to determining the first substantially real-time computing operation is initiated based at least partially on the first signal, determining whether the first signal is registered with the signal server; in response to determining the first signal is not registered with the signal server, transmitting, to the first input signal system, a request for a registration of the first signal with the signal server; receiving information associated with the request for the registration of the first signal with the signal server; in response to receiving the information associated with the request for the registration of the first signal with the signal server, establishing the registration of the first signal with the signal server; in response to establishing the registration of the first signal with the signal server, associating a movable matching signal with the first signal, wherein the movable matching signal is not associated with a second signal; determining a second substantially real-time computing operation initiated, based at least partially on the first signal, at a second input signal system comprising a second substantially real-time sensor; in response to determining the second substantially real-time computing operation is initiated based at least partially on the first signal, determining whether the movable matching signal is associated with the first signal; in response to determining the movable matching signal is associated with the first signal, executing the second substantially real-time computing operation based at least partially on the movable matching signal and the first signal; determining, during or after execution of the second substantially real-time computing operation, whether an attribute associated with the movable matching signal is extinguished; in response to determining, during or after the execution of the second substantially real-time computing operation, the attribute associated with the movable matching signal is extinguished, disassociating the movable matching signal from the first signal; determining a third substantially real-time computing operation initiated based at least partially on the second signal at a third input signal system comprising a third substantially real-time sensor; in response to determining the third substantially real-time computing operation is initiated based at least partially on the second signal, determining whether the movable matching signal is associated with the second signal; and in response to determining the movable matching signal is not associated with the second signal, executing the third substantially real-time computing operation based at least partially on the second signal, and not based on the movable matching signal, wherein the first signal and the second signal are storable.

In some embodiments, the first signal or the second signal comprises an identification signal. In some embodiments, the first signal or the second signal comprises an identification signal and a computing operation signal. In some embodiments, the identification signal is transmitted from the first input signal system on a first signal path, and wherein the computing operation signal is transmitted from the first input signal system on a second signal path. In some embodiments, determining whether the first signal is registered with the signal server comprises comparing the identification signal to one or more records in an identification database to determine whether the identification signal at least partially matches the one or more records in the identification database. In some embodiments, the first signal is comprised in or associated with a device or a physical object that interacts with the first input signal system or the second input signal system. In some embodiments, the first signal or the second signal is storable in a memory or a database. In some embodiments, the first input signal system, the second input signal system, or the third input signal system comprises or is comprised in a mobile computing system. In some embodiments, the first input signal system, the second input signal system, or the third input signal system comprises a fitness band. In some embodiments, the apparatus comprises or is comprised in at least one of a remote computing apparatus, a local computing apparatus, the first input signal system, the second input signal system, or the third input signal system.

In some embodiments, a method is provided for signal association and disassociation associated with execution of substantially real-time computing operations in a complex computing network, the method comprising: determining, using one or more computing device processors, a first substantially real-time computing operation initiated, based at least partially on a first signal, at a first input signal system comprising a first substantially real-time sensor; in response to determining the first substantially real-time computing operation is initiated based at least partially on the first signal, determining, using the one or more computing device processors, whether the first signal is registered with the signal server; in response to determining the first signal is not registered with the signal server, transmitting, using the one or more computing device processors, to the first input signal system, a request for a registration of the first signal with the signal server; receiving, using the one or more computing device processors, information associated with the request for the registration of the first signal with the signal server; in response to receiving the information associated with the request for the registration of the first signal with the signal server, establishing, using the one or more computing device processors, the registration of the first signal with the signal server; in response to establishing the registration of the first signal with the signal server, associating, using the one or more computing device processors, a movable matching signal with the first signal, wherein the movable matching signal is not associated with a second signal; determining, using the one or more computing device processors, a substantially real-time second computing operation initiated, based at least partially on the first signal, at a second input signal system comprising a second substantially real-time sensor; in response to determining the second substantially real-time computing operation is initiated based at least partially on the first signal, determining, using the one or more computing device processors, whether the movable matching signal is associated with the first signal; in response to determining the movable matching signal is associated with the first signal, executing, using the one or more computing device processors, the second substantially real-time computing operation based at least partially on at least one of the movable matching signal and the first signal; determining, using the one or more computing device processors, during or after execution of the second substantially real-time computing operation, whether an attribute associated with the movable matching signal is extinguished; in response to determining, during or after the execution of the second substantially real-time computing operation, the attribute associated with the movable matching signal is extinguished, disassociating, using the one or more computing device processors, the movable matching signal from the first signal; determining, using the one or more computing device processors, a third substantially real-time computing operation initiated based at least partially on the second signal at a third input signal system comprising a third substantially real-time sensor; in response to determining the third substantially real-time computing operation is initiated based at least partially on the second signal, determining, using the one or more computing device processors, whether the movable matching signal is associated with the second signal; and in response to determining the movable matching signal is not associated with the second signal, executing, using the one or more computing device processors, the third substantially real-time computing operation based at least partially on the second signal, and not based on the movable matching signal, wherein the first signal and the second signal are storable.

In some embodiments, the request for the registration of the first signal with the signal server transmitted to the first signal system is further based on a location of the first input signal system or on an attribute of the first signal. In some embodiments, the first input signal system, the second input signal system, or the third input signal system comprises or is comprised in a mobile computing system or a non-mobile computing system. In some embodiments, the first signal, or an identification signal associated with the first signal, is associated with or comprises a first computing token. In some embodiments, the first signal or the second signal is tokenized, or wherein a computing token is generated or extracted from at least a portion of the first signal or the second signal. In some embodiments, the first signal is tokenized at the first input signal system. In some embodiments, the first signal comprises an identification signal and a computing operation signal, wherein the identification signal is transmitted from the first input signal system on a first signal path to a first server for execution by the first server, and wherein the computing operation signal is transmitted from the first input signal system on a second signal path to a second server for execution by the second server. In some embodiments, the execution of the computing operation signal by the second server occurs after the execution of the first signal by the first server. In some embodiments, the execution of the computing operation signal by the second server is based on the execution of the first signal by the first server. In some embodiments, the one or more computing device processors are comprised in the first server, and wherein the first server is remote to the first input signal system, the second input signal system, and the third input signal system.

All of these drawings are illustrations of certain embodiments. The scope of the claims is not limited to the specific embodiments illustrated in the drawings and described below.

DETAILED DESCRIPTION OF THE EMBODIMENTS

Figure 1:
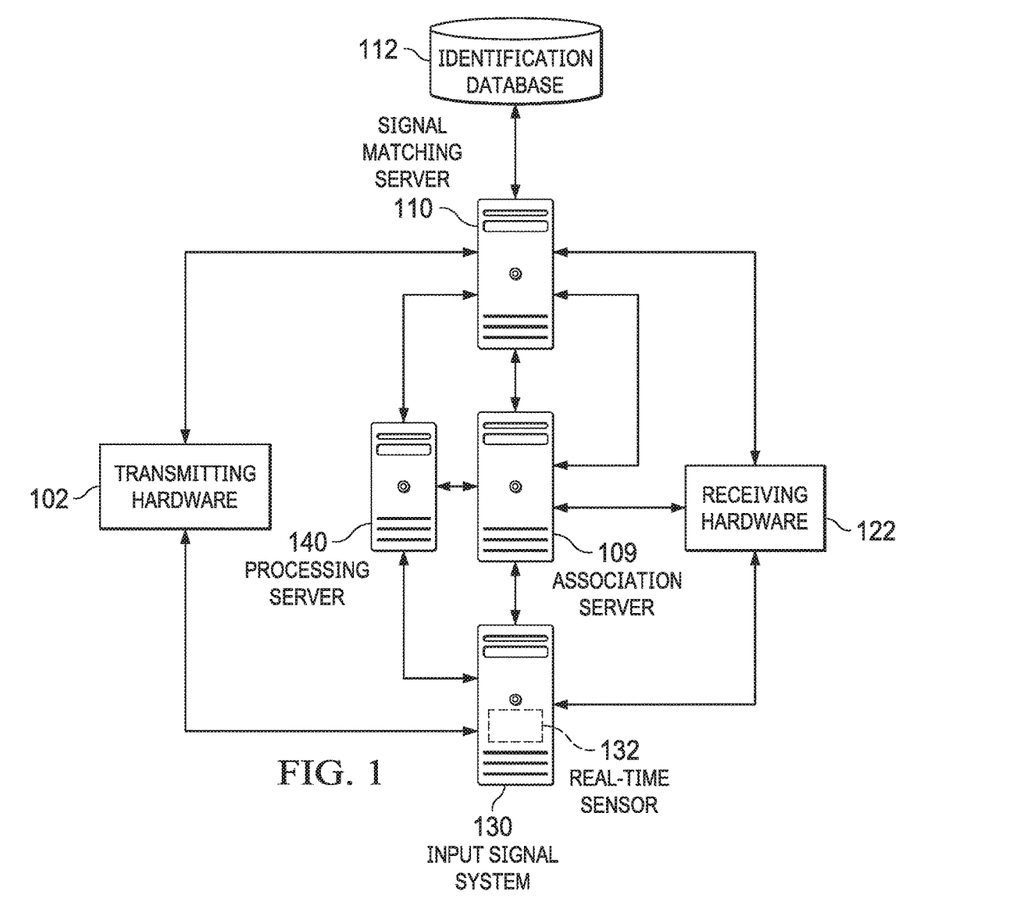
FIG. 1 is a block diagram of a complex computing network for modifying signal associations, in accordance with some embodiments of the invention.

FIG. 1 is a block diagram of a complex computing network for modifying signal associations in the complex computing network. FIG. 1 may comprise transmitting hardware 102, an input signal system 130 comprising a real-time sensor 132, a processing server 140, an association server 109, receiving hardware 122, a signal matching server 110, and an identification database 112. In some embodiments, the functionality of multiple devices in FIG. 1 may be combined in a single apparatus. The various servers described in this disclosure may refer to apparatuses, systems, devices, users, entities, etc. A server described herein may comprise a processor. Any processor described herein may be an intelligent processor. An intelligent processor may be a processor that learns of signal associations and executes computing operations based on the latest signal associations and signal disassociations. such apparatuses may also comprise memory that stores computer-readable code, which when executed by the processor, causes the processor and/or other elements in the apparatus to perform the various methods described in this disclosure. In some embodiments, the term, "signal" may refer to "data" or "information". In some embodiments, the association server 109 and the signal matching server 110 may be integrated into a single server. In some embodiments, even though some of the systems of FIG. 1 are not indicated as being connected, they may be connected to each other. In some embodiments, any signal described herein may be transitory. In some embodiments, the terms "using" and "based on" may be equivalent.

In some embodiments, any system described herein may comprise a housing that includes various units. The units may include a processor, a memory unit, an input/output unit, and a communication interface. In some embodiments, a chipset may be disposed in the housing and may be interfaced with the processor such as a signal processor. The chipset may have hardware (e.g., electronic components in an electronic circuit) for supporting various connections within the system (e.g. between units), or any other connection from the system to external systems or devices. The chipset may be an intelligent chipset for initiating an intelligent computing operation or an association or disassociation operation as described herein.

The transmitting hardware 102 may be associated with a first signal or may produce a first signal. The transmitting hardware 102 may be a computing device such as a mobile computing device. Alternatively, the transmitting hardware 102 may be non-computing hardware (e.g., a physical card). An input signal system 130 may comprise a real-time sensor 132. In some embodiments, the real-time sensor 132 may be a point-of-sale terminal such as a computing device (e.g., a mobile computing device, a non-mobile computing device). In some embodiments, the real-time sensor 132 may refer to any real-time means or computing means. The transmitting hardware 102 may transmit a first signal and the real-time sensor 132 may sense (e.g. determine, receive, etc.) the first signal. Any sensor described in this disclosure may be a signal sensor. The first signal may be transmitted to the processing server 140 which executes a computing operation based on the first signal.

A first system associated with the first signal may transmit a message to a second system associated with the second signal. The message may be transmitted over a network (e.g., a social network, a computing network, etc.). The first and second systems may be mobile devices such as mobile phones, tablets, watches, etc. The message may include an intention of transmitting a matching signal to a system associated with the second signal.

In some embodiments, the first signal may be associated with a matching signal. In some embodiments, a computing operation may need to be performed (e.g., based on or using the first signal) in order to associate the matching signal with the first signal. In some embodiments, the first signal may be associated with a matching signal upon the first signal being registered with the signal matching server 110. In some embodiments, the matching signal may be stored in at least one of the signal matching server 110 or the association server 109, and the association of the matching signal with the first signal may be stored in at least one of the signal matching server 110 or the association server 109.

In some embodiments, it may be needed to transfer or transmit the matching signal from being associated with the first signal to being associated with the second signal. The need for transfer may be based on a request signal transferred or transmitted to any of the systems described herein (e.g., the association server 109 and/or the signal matching server 110) from the system associated with the first signal. Upon receiving the transfer request, a determination may be made of whether the second signal is registered with the signal matching server 110. In response to the request signal, a notification signal may be transmitted to a system associated with the second signal. In some embodiments, the system associated with the first signal may comprise the transmitting hardware 102, and the system associated with the second signal may comprise the receiving hardware 122.

If the second signal is already registered with the signal matching server 110, then the notification signal may notify the system associated with the second signal that the second signal is now associated with the matching signal. Alternatively, the notification signal may notify the system associated with the second signal that an acceptance signal may need to be transmitted from the system to in order establish the association. If the second signal is not already registered with the signal matching server 110, then the second signal may need to register with the signal matching server 110. In some embodiments, registration comprises providing identification information associated with the second signal (and/or identification information associated with a system or user associated with the second signal). Upon acceptance or automatic acceptance of the association between the second signal and the matching signal, the first signal is disassociated from the matching signal. In some embodiments, while the first signal is disassociated from the matching signal, the first signal may continue to be virtually associated (or loosely associated) with the matching signal and/or the second signal. Any computing operation that is executed based on both the second signal and the matching signal may result in modification of an attribute associated with the first signal or association of a provisioning signal (e.g., a new matching signal) with the first signal. In order to make this modification happen, either the matching signal or the second signal is virtually associated with the first signal.

The second signal may be used in a computing operation at the input signal system 130. In some embodiments, the computing operation may be executed using an interaction with the receiving hardware 122. The input signal system 130 may forward the second signal to the processing server 140. The processing server 140 and/or the input signal system 13 may determine whether the second signal is associated with a matching signal. In order to determine whether the second signal is associated with a matching signal, the input signal system 130 and/or the processing server 140 may communicate with the association server 109 and/or the signal matching server 110 and/or the identification database 112 (which may store identification signals and first and/or second signals associated with matching signals). A search may be conducted by at least one of the association server 109 and/or the signal matching server 110 and/or the identification database 112 to determine whether the second signal is associated with a matching signal. If a matching signal is not found, the processing server 140 executes a computing operation based on the second signal. If a matching signal is found, the processing server 140 executes a computing operation based on the both, or at least one of, the second signal and the matching signal.

In some embodiments, if a matching signal is found, the determination is communicated to the input signal system 130. At the input signal system 130, a scan may be conducted (either before or after initiating and/or completing the process of determining whether a matching signal is associated with the second signal) to determine the resources (e.g., items, services, etc.) for which the computing operation is to be executed or has been executed. The scan may result in a list of resource signals. The list of resource signals may be associated with a particular session or transaction. In some embodiments, the matching signal may have been previously associated with a particular resource or resource signals. Therefore, the input signal system 130 (and optionally in coordination with the association server 109, the signal matching server 110, and/or the identification database 112) may compare the matching signal with the list of resource signals to determine whether there is a match. If there is a match, then the computing operation is executed (e.g., by the processing server 140) based on both the second signal and the matching signal. If there is no match, then the computing operation is executed based on just the second signal.

In some embodiments, upon execution (e.g., after or simultaneously with) of the computing operation based on both the second signal and the matching signal, a provisioning signal may be transmitted to a system associated with the first signal. The provisioning signal may comprise a new matching signal. The provisioning signal may not be transmitted to the system associated with the first signal if the computing operation is executed based on only the second signal and not based on the matching signal.

In some embodiments, any of the systems described herein may comprise application programming interfaces (APIs) for communicating with any of the other systems described herein. These APIs may be specialized non-generic APIs that are developed for the particular purpose of communicating with particular systems. In some embodiments, a method is provided for performing the various steps performed by any apparatus described herein. In some embodiments, a non-transitory computer-readable medium comprising code is provided for causing a computing device to perform the various methods described herein.

In some embodiments, the various devices of FIG. 1 correspond to and are the equivalent of devices with the same reference numerals (or different reference numerals) of FIG. 1 in the applications incorporated-by-reference below, even though some of the devices of FIG. 1 in the instant application carry different names from the devices of FIG. 1 in the applications incorporated-by-reference below. Although not shown, in some embodiments, the various devices of FIG. 1 include the same elements that are comprised in the devices associated with the same reference numerals (or different reference numerals) of FIG. 1 in the applications incorporated-by-reference below. In some embodiments, the various devices of FIG. 1 perform the same or similar operations as the devices associated with the same reference numerals (or different reference numerals) of FIG. 1 in the applications incorporated-by-reference below. Therefore, in some embodiments, the transmitting hardware 102 may be a form of payment 102, the input signal system 130 may be the merchant 130, the real-time sensor 132 may be the POS terminal 132, the association server 109 may be the vGift store 109, the processing server 140 may be the payment system 140, the signal matching server 110 may be card matching server 110, the identification database 112 may be the user database 112, and the receiving hardware 122 may be the form of payment 122.

Figure 2:
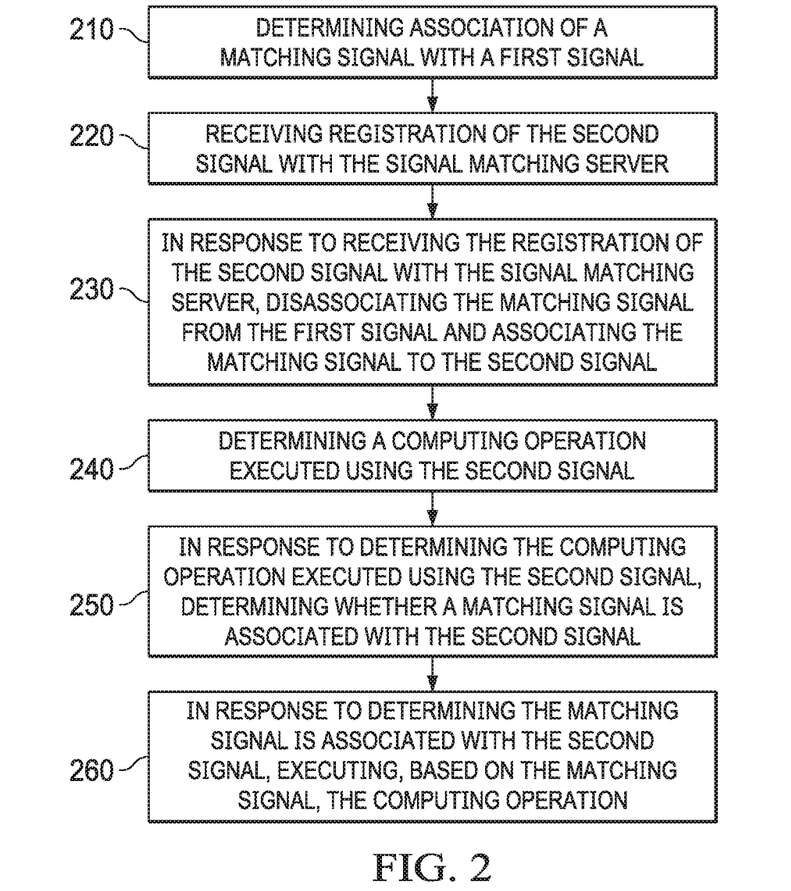
FIG. 2 is a block diagram of a method for modifying signal associations in a complex computing network, in accordance with some embodiments of the invention.

FIG. 2 is a block diagram of a method for modifying signal associations in a complex computing network. The various blocks of FIG. 2 may be executed in a different order from that shown in FIG. 2. At block 210, the method comprises determining association of a matching signal with a first signal. In some embodiments, the first signal is unaffected by the association of the matching signal with the first signal. At block 220, the method comprises receiving registration of the matching signal with a second signal. At block 230, the method comprises in response to receiving the registration of the matching signal with the second signal, disassociating the matching signal from the first signal and associating the matching signal to the second signal. In some embodiments, the first signal is unaffected by the disassociation of the matching signal with the first signal, and the second signal is unaffected by the association of the matching signal with the second signal. At block 240, the method comprises determining a computing operation executed using the second signal. At block 250, the method comprises in response to determining the computing operation executed using the second signal, determining whether a matching signal is associated with the second signal. At block 260, the method comprises in response to determining the matching signal is associated with the second signal, executing, based on the matching signal, the computing operation. In some embodiments, execution of the computing operation affects (e.g., a decreases or extinguishes entirely) an attribute (e.g., a numerical amount) of the second signal or the matching signal. In some embodiments, an attribute could represent a value associated with a signal. In some embodiments, execution of the computing operation (associated with the second signal and the matching signal) affects (e.g., increases) an attribute (e.g., a numerical amount) of the first signal. As described herein, the signal matching server may refer to at least one of the signal matching sever, the association server, and/or the identification database presented in FIG. 1. The present application incorporates-by-reference (IBR) the entirety of U.S. application Ser. No. 13/231,946, filed Sep. 13, 2011, titled "Systems and Methods for Virtual Transferring of Gifts," for all purposes.

The present application incorporates-by-reference the entirety of U.S. Application No. 61/382,464, filed Sep. 13, 2010, titled "Systems and Methods for Virtual Transferring of Gifts," for all purposes.

The present application incorporates-by-reference the entirety of U.S. application Ser. No. 15/076,876, filed Mar. 22, 2016, titled "Real-time Sensors in Complex Computing Networks," for all purposes.

In some embodiments, the transmitting or receiving hardware may comprise a mobile device such as a mobile phone, watch, fitness band, etc. In such embodiments, the signal transmitted from the transmitting or receiving hardware may comprise a signal (e.g., an identification signal) that is unique to the mobile device or to an account associated with the mobile device. For example, such a signal may be a mobile device phone number, or any other device identification numbers. In some embodiments, the mobile device may comprise or have access to (e.g., from a cloud server) digital versions of multiple transmitting or receiving hardware. In some embodiments, the mobile device may include functionality of both the transmitting or receiving hardware and the input signal system. Therefore, the mobile device may perform any process or comprise any feature that is described with respect to the transmitting or receiving hardware and/or the input signal system. For example, any message that may be presented on the display associated with the real-time sensor or the input signal system, may additionally or alternatively be presented on a display of the mobile device. In some embodiments, any of the systems illustrated in FIG. 1 (e.g., the input signal system) may determine that the transmitting or receiving hardware is a mobile device. In response to determining that the transmitting or receiving hardware is a mobile device, the system may prompt the mobile device for transmission of the first or second signal.

In some embodiments, any transmissions between the mobile device and any of the systems may be via any short range (e.g., near field communication, Bluetooth, Bluetooth Low Energy, etc.) or long range wireless transmission mechanisms (e.g., cellular, Wi-Fi, etc.). In some embodiments, the frequency of transmission may not be limited to any particular frequency of the electromagnetic spectrum.

The present invention may have uses in many fields, such as computing science and software, electronic commerce, digital signal processing, medical software, etc. Any exemplary uses are described herein are for illustration purposes only. In some embodiments, the first signal or the second signal may comprise payment information such as payment card information. In some embodiments, the transmitting or receiving hardware may comprise a card such as a payment card, an identification card, a loyalty card, etc., or a device such as a payment device, or mobile device such as a mobile phone or watch. The card may be associated with an amount. In some embodiments, the matching signal may comprise a virtual gift or Vgift, a coupon, a gift card, an offer, a discount, a deal, etc. In some embodiments, a computing operation may refer to a payment operation. Executing a computing operation based on a first or second signal and a matching signal may result in a discount for a purchased resource or service. Executing a computing operation based on just the first or second signal, and not the matching signal, may not result in a discount for a purchased resource or service. A matching signal may be movable because it can be associated and disassociated with first and second signals. A signal may be temporal because it may be associated with a certain validity period. A provisioning signal as described herein may be a reward. An identification signal may be identification information for a user or entity associated with the first or second signal. A real-time computing operation may be a payment operation executed at a point-of-sale terminal. In some embodiments, the matching signal may be associated with a particular purchase item or resource. Upon scanning a shopping cart, a determination may be made whether a purchase item (e.g., a signal associated with the purchase item) matches the matching signal. In some embodiments, a value associated with a signal may refer to an amount of funds associated with a payment card, a virtual gift, a gift card, a coupon, etc. Increasing the value of a signal may represent a deposit while decreasing the value of a signal may refer to a withdrawal. A session or transaction described herein may be a purchase or shopping transaction or session.

As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, the term "modify" or "modification" may be interchangeably used with the term "transform" or "transformation."

There is a need for using a single input signal to perform disparate computing operations in a complex computing network without needing to use different input signals for performing the disparate computing operations.

Figure 3:
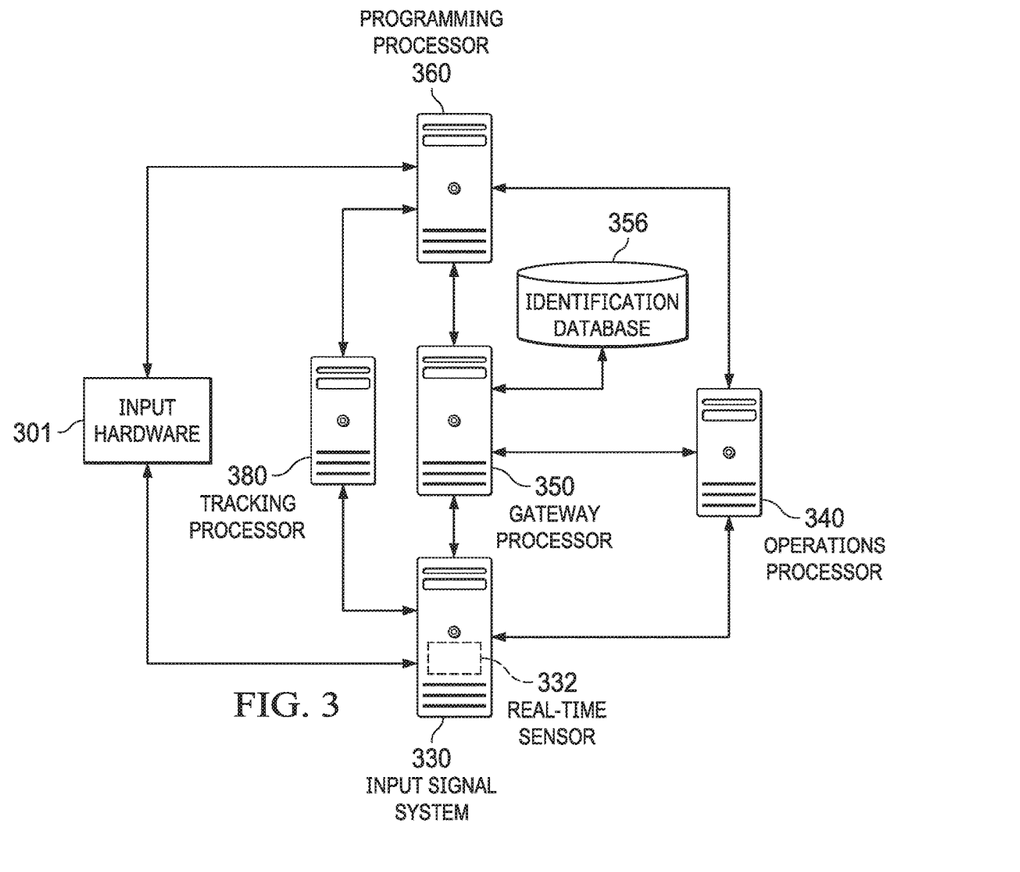
FIG. 3 is a block diagram of a complex computing network for real-time routing of an input signal received from a real-time sensor to perform disparate computing operations in the complex computing network, in accordance with some embodiments of the invention.

FIG. 3 is a block diagram of a complex computing network for real-time routing of an input signal received from a real-time sensor to perform disparate computing operations in the complex computing network. FIG. 3 may comprise an input hardware 301, an input signal system 330, an operations processor 340, a gateway processor 350, a programming processor 360, and a tracking processor 380. In some embodiments, the various processors described herein may be replaced with other types of processors. In some embodiments, the functionality of multiple devices in FIG. 3 may be combined in a single apparatus. The various processors described in this disclosure may refer to apparatuses, systems, devices, etc., comprising such processors. Such apparatuses may also comprise memory that stores computer-readable code, which when executed by the processor, causes the processor and/or other elements in the apparatus to perform the various methods described in this disclosure. In some embodiments, the term "signal" may refer to "data" or "information."

The input hardware 301 may produce an input signal. The input hardware 301 may be a computing device such as a mobile computing device. Alternatively, the input hardware 301 may be non-computing hardware (e.g. a physical card). An input signal system 330 may comprise a real-time sensor 332. In some embodiments, the real-time sensor 332 may be a point-of-sale terminal such as a computing device (e.g., a mobile computing device, a non-mobile computing device). In some embodiments, the real-time sensor 332 may refer to any real-time means or computing means. The input hardware 301 may transmit an input signal and the real-time sensor 332 may sense (e.g., determine, receive, etc.) the input signal. Any sensor described in this disclosure may be a computing device. In some embodiments, a sensor in this disclosure may be a signal sensor. The input signal may be transmitted to at least one of the gateway processor 350 (e.g., on a first connection), the operations processor 340 (e.g., on a second connection), or the tracking processor 380 (e.g., on a fourth connection). In some embodiments, the connection between the gateway processor 350 and the identification database 356 (e.g., associated with a loyalty program) may be remembered as a third connection.

In some embodiments, a portion of the input signal (e.g., the identification signal) is extracted by the input signal system 330 or the real-time sensor 332 and is transmitted to at least one of the gateway processor 350, the operations processor 340, or the tracking processor 380. In some embodiments, either different portions and/or the same portion of the input signal are transmitted to at least one of the gateway processor 350, the operations processor 340, or the tracking processor 380. In some embodiments, the input signal may be transformed by the input signal system 330 into one or more transformed signals, and each of the different transformed signals may be transmitted to at least one of the gateway processor 350, the operations processor 340, or the tracking processor 380. In some embodiments, each of the first connection, the second connection, the third connection, and the fourth connection may be distinct such that the only the gateway processor 350, and not the operations processor 340, may communicate with the input signal system 330 on the first connection, only the operations processor 340, and not the gateway processor 350, may communicate with the input signal system 330 on the second connection, etc. In alternate embodiments, at least one of the first connection, the second connection, the third connection, and the fourth connection may be coupled into a single connection.

In some embodiments, the gateway processor 350 may include a signal communication interface for establishing a first connection to the input signal system 330, and receiving the input signal on the first connection. In some embodiments, the gateway processor 350 may comprise or may be associated with an identification sensor for identifying the identification signal in the input signal. The signal communication interface may also be used for establishing a third connection to an identification database 356, and accessing records in the identification database 356 on the third connection. In some embodiments, the identification database 356 may be part of the gateway processor 350, while in other embodiments, the identification database 356 may be located remotely from the gateway processor 350. The gateway processor 350 may execute a first computing operation. The first computing operation may comprise comparing the identification signal in the input signal to a record in the identification database 356, and determining whether the identification signal matches a record in the identification database 356. In response to determining the identification signal does not match a record in the identification database 356, the gateway processor 350 may transmit to the input signal system 330 a request for creating a record for the identification signal in the identification database 356. In response to transmitting the request for creating a record for the identification signal in the identification database 356, the gateway processor 350 may receive a second signal from the input signal system 330. The second signal may comprise a response to the request for creating a record for the identification signal in the identification database 356. In some embodiments, the response may comprise acceptance of the request for creating a record for the identification signal in the identification database 356. Alternatively, the response may comprise declining the request for creating a record for the identification signal in the identification database 356.

The input signal transmitted on the second connection from the input signal system 330 to the operations processor 340 may be used by the operations processor 340 to execute a second computing operation. The second computing operation executed by the operations processor 340 may be different from the first computing operation executed by the gateway processor 350. The second computing operation may be executed at least one of before, after, or substantially simultaneously with the first computing operation. While the disclosure indicates that the first computing operation and the second computing operation are executed by different processors, in other embodiments, the first computing operation and the second computing operation may be executed by the same processor.

In some embodiments, in response to determining the identification signal does not match a record in the identification database 356, the gateway processor 350 may transmit to the input signal system 330 or to the operations processor 340 (either directly or via the input signal system 330) an indication that a record does not exist in the identification database 356. In such embodiments, before the gateway processor 350 transmits, to the input signal system 330, a request for creating a record for the identification signal in the identification database 356, or before a request for creating a record for the identification signal in the identification database 356 is presented at the real-time sensor 332, the operations processor 340 may execute the second computing operation. The operations processor 340 may then communicate the completion of the second computing operation to the input signal system 330 and/or the gateway processor 350. The input signal system 330, either on its own or based on a message received from the gateway processor 350, may prompt the real-time sensor 332 to sense a second input signal, which may be a request for creating a record for the identification signal in the identification database 356. The second input signal may be the same as or different from the input signal. The second input signal (or an identification signal comprised in the second input signal) may be transmitted from the input signal system 330 to the gateway processor 350. The gateway processor 350 may access the identification database 356 to create a record in the identification database 356 for the identification signal comprised in the second input signal. Therefore, in such embodiments, the identification signal in the first input signal may be used to determine whether a record for the identification sign al exists in the identification database 356, and the identification signal in the second input signal may be used to create a record for the identification signal in the identification database 356. The identification signal in the first input signal may either be the same as or different from the identification signal in the second input signal. However, both identification signals may be associated with the same input hardware.

In some embodiments, in response to determining the identification signal matches a record in the identification database 356, the gateway processor 350 may transmit to the input signal system 330 or to the operations processor 340 (either directly or via the input signal system 330) an indication that a record exists in the identification database 356. Additionally, the gateway processor 350 may transmit a transformational attribute (e.g., a discount) that is applied to the input signal. Alternatively, the transformational attribute may be generated by the input signal system 330 and/or the operations processor 340 upon receiving the indication (e.g., from the gateway processor 350) that a record exists in the identification database 356. The transformational attribute may be applied to the input signal at at least one of the input signal system 330 and/or the operations processor 340 and/or the gateway processor 350. As an example, the transformational attribute may be applied to the input signal at least one of prior to, during, or after the second computing operation. In some embodiments, either prior to, during, or after execution of the second computing operation, the operations processor 340 may transmit a message to the input signal system 330. The message may be displayed on a display associated with the real-time sensor 332. The message may be associated with the transformed input signal i.e., the result of applying the transformational attribute to the input signal.

In some embodiments, the functionality of the gateway processor 350 may be performed by two separate processors that may interact with each other. One of the processors (e.g., a communications processor) may perform the functions of interacting with the input signal system 330 such as receiving the input signal, the second input signal, or the identification signal, and transmitting a second signal to the input signal system 330, and/or transmitting a prompt or prompting the real-time sensor 332 in the input signal system 330 for sensing a second input signal. The other processor (e.g., a matching processor) may perform the functions of interacting with the identification database 356 and determining whether a matching record for the identification signal exists in the identification database 356.

In some embodiments, the transmission, to the input signal 330, of the request for creating a record of the identification signal in the identification database 356 is further based on a location of the real-time sensor 330. In some embodiments, the transmission, to the input signal system 330, of the request for creating a record for the identification signal in the identification database 356 is further based on an attribute of the second computing operation. In some embodiments, the signal communication interface is further used for establishing a connection to a programming processor 360, wherein the programming processor transmits a trigger signal that causes sensing of the input signal at the real-time sensor 332.

In some embodiments, the gateway processor 350 further comprises a first application programming interface (API) for communicating with the programming processor 360, and a second API different from the first API, for communicating with the input signal system 340. These APIs may be specialized non-generic APIs that are developed for the particular purpose of communicating with particular devices.

In some embodiments, the input signal or the identification signal may be associated with a computing token or tokenized. Tokenization may be a form of data transformation. Therefore, the input signal and/or identification signal may be converted to a token or token signal. The input signal and/or identification signal may not be able to be recovered or retransformed from the token signal. In some embodiments, the token signal instead of or in addition to the input signal and/or the identification signal, may be used for performing the first computing operation described in this disclosure. In some embodiments, the token signal may be shared with other processors, or networks such as computing networks or social networks. The tokenization may be executed by at least one of the input signal system 330 (and/or the real-time sensor 332), the gateway processor 350, or the operations processor 140. In some embodiments, the gateway processor 350 may execute a computing operation for storing a token (e.g., the token associated with the identification signal) in the record for the identification signal in the identification database 356.

In some embodiments, a method is provided for performing the various steps performed by any apparatus described herein. In some embodiments, a non-transitory computer-readable medium comprising code is provided for causing a computing device to perform the various methods described herein In some embodiments, the various devices of FIG. 3 correspond to and are the equivalent of devices with the same reference numerals (or different reference numerals) of FIG. 3 in the applications incorporated-by-reference below, even though some of the devices of FIG. 3 in the instant application carry different names from the devices of FIG. 3 in the applications incorporated-by-reference below. Although not shown, in some embodiments, the various devices of FIG. 3 include the same elements that are comprised in the devices associated with the same reference numerals (or different reference numerals) of FIG. 3 in the applications incorporated-by-reference below. In some embodiments, the various devices of FIG. 3 perform the same or similar operations as the devices associated with the same reference numerals (or different reference numerals) of FIG. 3 in the applications incorporated-by-reference below.

Figure 4:
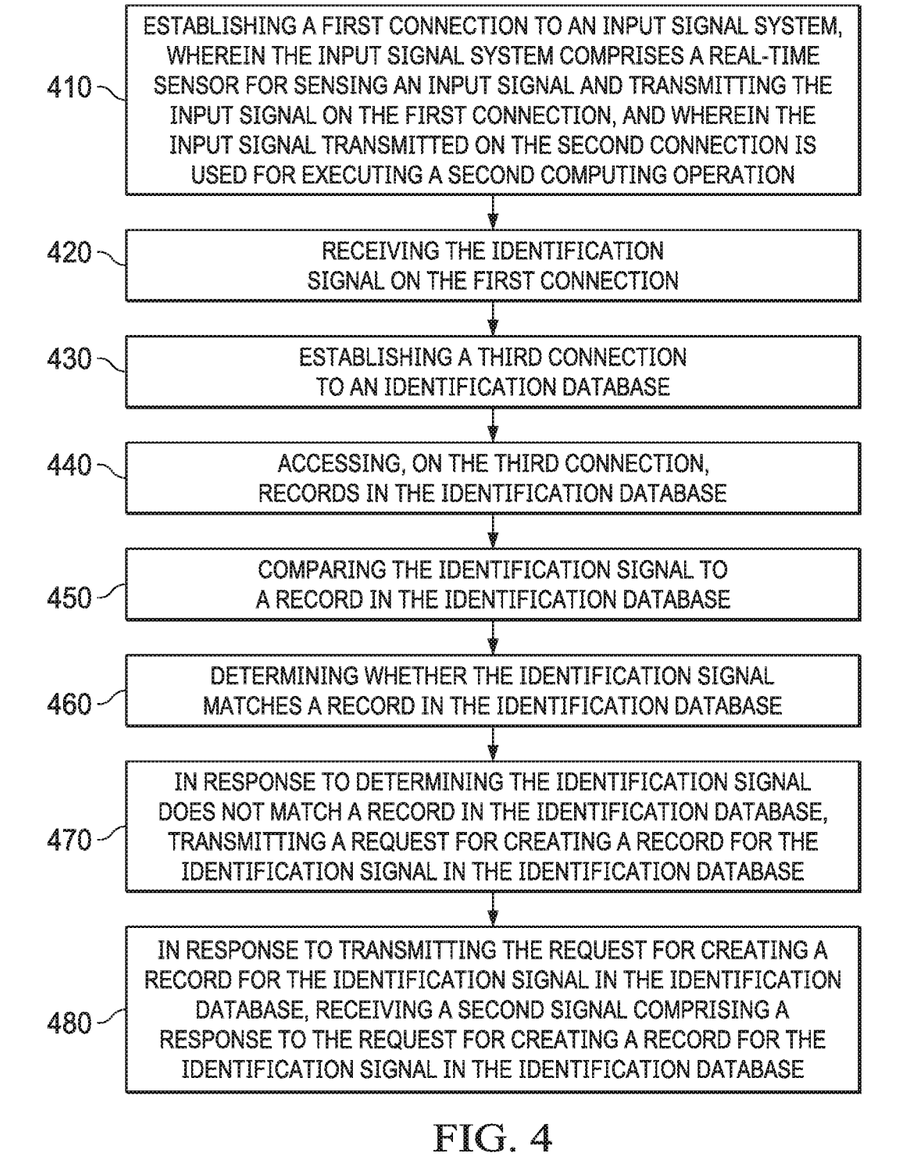
FIG. 4 is a block diagram of a method for real-time routing of an input signal received from a real-time sensor to perform disparate computing operations in a complex computing network, in accordance with some embodiments of the invention.

FIG. 4 is a block diagram of a method for real-time routing of an input signal received from a real-time sensor to perform disparate computing operations in a complex computing network, wherein but for the real-time routing of the input signal, which is necessarily rooted in computing technology, separate input signals would be needed for performing the disparate computing operations. The various blocks of FIG. 4 may be executed in a different order from that shown in FIG. 4. At block 410, the method comprises establishing a first connection to an input signal system, wherein the input signal system comprises a real-time sensor for sensing (e.g., determining, receiving, etc.) an input signal and transmitting the input signal on a first connection and a second connection, wherein the input signal comprises an identification signal, wherein the input signal transmitted on the first connection is used for executing a first computing operation, and wherein the input signal transmitted on the second connection is used for executing a second computing operation. At block 420, the method comprises receiving the input signal and/or the identification signal on the first connection. At block 430, the method comprises establishing a third connection to an identification database. At block 440, the method comprises accessing, on the third connection, records in the identification database.

At block 450, the method comprises comparing the identification signal to a record in the identification database. At block 460, the method comprises determining whether the identification signal matches a record in the identification database. At block 470, the method comprises in response to determining the identification signal does not match a record in the identification database, transmitting to the input signal system or the real-time sensor, a request for creating a record for the identification signal in the identification database. At block 480, the method comprises in response to transmitting the request for creating a record for the identification signal in the identification database, receiving a second signal from the input signal system or the real-time sensor, the second signal comprising a response to the request for creating a record for the identification signal in the identification database. In some embodiments, the response comprises acceptance of the request for creating a record for the identification signal in the identification database. In some embodiments, any signal as described herein may be a non-transitory signal. In other embodiments, any signal as described herein may be a transitory signal.

In some embodiments, the input signal is associated with a computing token. In some embodiments, the identification signal is associated with a computing token. In some embodiments, the input signal or the identification signal is tokenized. In some embodiments, the input signal or the identification signal is tokenized by the input signal system or by the input hardware such as a mobile device. In some embodiments, the input signal or the identification signal is tokenized by the gateway processor. In some embodiments, the input signal or the identification signal is tokenized by the operations processor. In some embodiments, the identification database is located remotely from the gateway processor, while in other embodiments, the identification database is coupled to the gateway processor. In some embodiments, the gateway processor is further configured for storing a computing token in the record for the identification signal in the identification database.

The present application incorporates by reference (IBR) the entirety of U.S. application Ser. No. 14/794,593, filed Jul. 8, 2015, titled "Systems and Methods for Enrolling Consumers in a Program," for all purposes.

The present application incorporates-by-reference the entirety of U.S. application Ser. No. 13/937,132, filed Jul. 8, 2013, titled "Systems and Methods for Registering Consumers in a Consumer Program While Accessing a Network," for all purposes.

The present application incorporates-by-reference the entirety of U.S. application Ser. No. 13/708,814, filed Dec. 7, 2012, titled "Systems and Methods for Registering Consumers in a Consumer Program While Accessing a Network," for all purposes.

The present application incorporates-by-reference the entirety of U.S. Provisional Application No. 61/568,637, filed Dec. 8, 2011, titled "Systems and Methods for Using a Payment System to Register Consumers in a Loyalty Program," for all purposes.

The present application is a continuation of U.S. application Ser. No. 15/147,884, filed May 5, 2016, titled "Modifying Signal Associations in Complex Computing Networks," which is a continuation-in-part of U.S. application Ser. No. 13/231,946, filed Sep. 13, 2011, titled "Systems and Methods for Virtual Transferring of Gifts," which is a non-provisional of U.S. Application No. 61/382,464, filed Sep. 13, 2010, titled "Systems and Methods for Virtual Transferring of Gifts," all of which are incorporated by reference herein for all purposes. The present application is also a continuation of U.S. application Ser. No. 15/076,876, filed Mar. 22, 2016, titled "Real-time Sensors in Complex Computing Networks," which is a continuation-in-part of U.S. application Ser. No. 14/794,593, filed Jul. 8, 2015, titled "Systems and Methods for Enrolling Consumers in a Program," which is a continuation-in-part of U.S. application Ser. No. 13/937,132, filed Jul. 8, 2013, titled "Systems and Methods for Registering Consumers in a Consumer Program While Accessing a Network," which is a continuation of U.S. application Ser. No. 13/708,814, filed Dec. 7, 2012, titled "Systems and Methods for Registering Consumers in a Consumer Program While Accessing a Network," which is a non-provisional of U.S. Provisional Application No. 61/568,637, filed Dec. 8, 2011, titled "Systems and Methods for Using a Payment System to Register Consumers in a Loyalty Program," all of which are incorporated by reference herein for all purposes.

In some embodiments, the input signal transmitted from the input hardware may comprise a second identification signal. In some embodiments, the input hardware may comprise this second identification signal. In some embodiments, the second identification signal may be a token or a number that is generated based on any components of the input signal. In some embodiments, the second identification signal may be dynamically generated at the time of transmitting the input signal to the input signal system, comprising the real-time sensor. In some embodiments, the second identification signal may be transmitted to the input signal system separately from the input signal and/or the identification signal. In some embodiments, the token described in this disclosure may be a type of second identification signal. As an example, the input signal may comprise an identification signal. Either the input signal or the identification signal may include a name, an input hardware number, an address, a phone number, or another number or alphanumeric quantity other than the numbers listed herein, etc. In some embodiments, the second identification signal and the identification signal may refer to the same signal, while in other embodiments, the second identification signal and the identification signal may refer to different signals.

In some embodiments, the second identification signal may not be secured or encrypted, unlike the input signal and/or the identification signal. In other embodiments, the second identification signal may be secured or encrypted as well; however the level of security or encryption of the second identification signal may be less than or equal to the level of security or encryption of the input signal or the identification signal. In some embodiments, any of the features or processes described in any part of this disclosure, including any applications incorporated herein by reference, that are associated with the input signal and/or the identification signal, may additionally or alternatively be associated with the second identification signal. Therefore, the second identification signal may be transmitted to the gateway processor, and the gateway processor may use the second identification signal to determine whether a matching record exists in the identification database. Additionally, the second identification signal may be used to create a new record in the identification database if a matching record does not exist in the database.

In some embodiments, the input hardware may comprise a mobile device such as a mobile phone, watch, fitness band, etc. In such embodiments, the identification signal and/or the second identification signal may comprise a signal that is unique to the mobile device or to an account associated with the mobile device. For example, such a signal may be a mobile device phone number, or any other device identification numbers. In some embodiments, the mobile device may comprise or have access to (e.g., from a cloud server) digital versions of multiple input hardware. In some embodiments, the mobile device may include functionality of both the input hardware and the input signal system. Therefore, the mobile device may perform any process or comprise any feature that is described with respect to the input hardware and/or the input signal system. For example, any message that may be presented on the display associated with the real-time sensor or the input signal system, may additionally or alternatively be presented on a display of the mobile device. In some embodiments, any of the systems illustrated in FIG. 3 (e.g., the input signal system) may determine that the input hardware is a mobile device. In response to determining that the input hardware is a mobile device, the system may prompt the mobile device for transmission of an input signal. The input signal transmitted from the mobile device may include at least one of the identification signal and/or the second identification signal.

In alternate embodiments, the input signal transmitted from the mobile device may not include the identification signal and/or the second identification signal, or may include just the identification signal and not the second identification signal. The input signal may include information necessary to perform the second computing operation. Following the second computing operation, any of the systems of FIG. 3 may prompt the mobile device for transmission of the identification signal and/or the second identification sign al. In some embodiments, any transmissions between the mobile device and any of the systems may be via any short range (e.g., near field communication, Bluetooth, Bluetooth Low Energy, etc.) or long range wireless transmission mechanisms (e.g., cellular, Wi-Fi, etc.). In some embodiments. the frequency of transmission may not be limited to any particular frequency of the electromagnetic spectrum.

In some embodiments, prior to transmission of the identification signal and/or the second identification signal to the system, the system may prompt the user of the mobile device for permission to transmit the identification signal and/or the second identification signal. For a subsequent transmission of the identification signal and/or the second identification signal at the same establishment (e.g., a single establishment may be associated with multiple geographical locations), permission of the user is not required to transmit the identification signal and/or the second identification signal to any of the described systems.

The system may determine, based on the identification signal and/or the second identification signal that a matching record associated with the identification signal and/or the second identification signal is not present in the identification database. In such embodiments, the system may send to the mobile device a request to the mobile device to create a record in the identification database. The mobile device may respond either positively or negatively in response to the request.

In some embodiments, the input hardware (e.g., the mobile device) may be associated with multiple identification signals and/or multiple second identification signals. In such embodiments, at least one of the identification signals or second identifications signals such as a mobile device number may be used to link together the multiple identification signals and/or the multiple second identification signals. This linking second identification signal may be the identifications signal that is used by the gateway processor to determine whether a matching record exists for the linking second identification signal in the identification database.

In some embodiments, an apparatus is provided for real-time routing of an input signal and an identification signal received from a mobile device via a real-time computing means to perform disparate computing operations in a complex computing network, wherein but for the real-time routing of the input signal and the identification signal, which is necessarily rooted in computing technology, the identification signal would need to be included in the input signal. The apparatus comprises a signal communication interface for: establishing a first connection to an input signal system, wherein the input signal system comprises a real-time computing means for sensing the input signal and transmitting the input signal on a first connection and for sensing the identification signal and transmitting the identification signal on a second connection, wherein the input signal transmitted on the first connection is used for executing a first computing operation, and wherein the identification signal transmitted on the second connection is used for executing a second computing operation; receiving the identification signal on the first connection; establishing a third connection to an identification database; and accessing, on the third connection, records in the identification database; and a gateway processor for executing the first computing operation, the first computing operation comprising: comparing the identification signal to a record in the identification database; determining whether the identification signal matches a record in the identification database; in response to determining the identification signal does not match a record in the identification database, transmitting to the input signal system or to a mobile device, a request for creating a record for the identification signal in the identification database; and in response to transmitting the request for creating a record for the identification signal in the identification database, receiving a second signal from the real-time sensor, the input signal system, or the mobile device, the second signal comprising a response to the request for creating a record for the identification signal in the identification database, wherein the input signal transmitted on the second connection is received by an operations processor that executes the second computing operation.

In some embodiments, an apparatus for real-time routing of an input signal and an identification signal received from an input data system to perform disparate computing operations in a complex computing network, wherein but for the real-time routing of the input signal and the identification signal, which is necessarily rooted in computing technology, the identification signal would need to be included in the input signal. The apparatus comprises a signal communication interface for: establishing a first connection to an input signal system, wherein the input signal system transmits the input signal on a first connection and transmits the identification signal on a second connection, wherein the input signal transmitted on the first connection is used for executing a first computing operation, and wherein the identification signal transmitted on the second connection is used for executing a second computing operation; receiving the identification signal on the first connection; establishing a third connection to an identification database; and accessing, on the third connection, records in the identification database; and a gateway processor for executing the first computing operation, the first computing operation comprising: comparing the identification signal to a record in the identification database; determining whether the identification signal matches a record in the identification database; in response to determining the identification signal does not match a record in the identification database, transmitting to the input signal system, a request for creating a record for the identification signal in the identification database; and in response to transmitting the request for creating a record for the identification signal in the identification database, receiving a second signal from the real-time sensor or the input signal system, the second signal comprising a response to the request for creating a record for the identification signal in the identification database, wherein the input signal transmitted on the second connection is received by an operations processor that executes the second computing operation. In some embodiments, the input signal system comprise at least one of a mobile device or a real-time sensor, which may be also referred to as any real-time computing means in some embodiments.

In some embodiments, the input signal may comprise payment information. In some embodiments, the input hardware may comprise a card such as a payment card, an identification card, a loyalty card, etc., or a device such as a payment device, or mobile device such as a mobile phone or watch. In some embodiments, the first computing operation may comprise a loyalty processing operation, and the second computing operation may comprise a payment or a transaction processing operation. In some embodiments, the identification database may be associated with a loyalty program. In some embodiments, the second identification signal may be referred to as a loyalty token or loyalty identification number. In some embodiments, the identification signal may comprise identification information associated with the input signal or associated with a user of the input signal system. In some embodiments, the sensor may comprise or be associated with a display that displays an amount. In some embodiments, the amount may be displayed on the display upon receiving information associated with a product or service to be purchased. In some embodiments, the transformational attribute as described previously may be applied to the amount, and the discounted amount may be displayed on the display.

The present disclosure provides several important technical advantages that will be readily apparent to one skilled in the art from the figures, descriptions, and claims. Moreover, while specific advantages have been enumerated above, various embodiments may include an, some, or none of the enumerated advantages.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s, and their equivalents, that are protected thereby. In all instances, the scope of such claims shall be considered on their own merits in light of this disclosure, but should not be constrained by the headings herein.

The invention claimed is:

1. An apparatus for associating or disassociating signals associated with execution of substantially real-time computing operations in a complex computing network, the apparatus comprising one or more computing device processors configured for:
    determining a first substantially real-time computing operation is initiated, based at least partially on a first signal, at a first input signal system comprising a first substantially real-time sensor;
    in response to determining the first substantially real-time computing operation is initiated based at least partially on the first signal, determining whether the first signal is registered with the signal server;
    in response to determining the first signal is not registered with the signal server, transmitting, to the first input signal system, a request for a registration of the first signal with a signal server;
    receiving information associated with the request for the registration of the first signal with the signal server;
    in response to receiving the information associated with the request for the registration of the first signal with the signal server, establishing the registration of the first signal with the signal server;
    in response to establishing the registration of the first signal with the signal server, associating a movable matching signal with the first signal, wherein the movable matching signal is not associated with a second signal;
    determining a second substantially real-time computing operation is initiated, based at least partially on the first signal, at a second input signal system comprising a second substantially real-time sensor;
    in response to determining the second substantially real-time computing operation is initiated based at least partially on the first signal, determining whether the movable matching signal is associated with the first signal;
    in response to determining the movable matching signal is associated with the first signal, executing the second substantially real-time computing operation based at least partially on the movable matching signal and the first signal;
    determining, during or after the execution of the second substantially real-time computing operation, whether an attribute associated with the movable matching signal is extinguished;
    in response to determining, during or after the execution of the second substantially real-time computing operation, the attribute associated with the movable matching signal is extinguished, disassociating the movable matching signal from the first signal;
    determining a third substantially real-time computing operation is initiated based at least partially on the second signal at a third input signal system comprising a third substantially real-time sensor;
    in response to determining the third substantially real-time computing operation is initiated based at least partially on the second signal, determining whether the movable matching signal is associated with the second signal; and
    in response to determining the movable matching signal is not associated with the second signal, executing the third substantially real-time computing operation based at least partially on the second signal, and not based on the movable matching signal,
    wherein the first signal and the second signal are storable.

2. The apparatus of claim 1, wherein the first signal or the second signal comprises an identification signal.

3. The apparatus of claim 1, wherein the first signal or the second signal comprises an identification signal and a computing operation signal.

4. The apparatus of claim 3, wherein the identification signal is transmitted from the first input signal system on a first signal path, and wherein the computing operation signal is transmitted from the first input signal system on a second signal path.

5. The apparatus of claim 3, wherein determining whether the first signal is registered with the signal server comprises comparing the identification signal to one or more records in an identification database to determine whether the identification signal at least partially matches the one or more records in the identification database.

6. The apparatus of claim 1, wherein the first signal is comprised in or associated with a device or a physical object that interacts with the first input signal system or the second input signal system.

7. The apparatus of claim 1, wherein the first signal or the second signal is storable in a memory or a database.

8. The apparatus of claim 1, wherein the first input signal system, the second input signal system, or the third input signal system comprises or is comprised in a mobile computing system.

9. The apparatus of claim 1, wherein the first input signal system, the second input signal system, or the third input signal system comprises a fitness band.

10. The apparatus of claim 1, wherein the apparatus comprises or is comprised in at least one of a remote computing apparatus, a local computing apparatus, the first input signal system, the second input signal system, or the third input signal system.

11. A method for signal association and disassociation associated with execution of substantially real-time computing operations in a complex computing network, the method comprising:

determining, using one or more computing device processors, a first substantially real-time computing operation is initiated, based at least partially on a first signal, at a first input signal system comprising a first substantially real-time sensor;

in response to determining the first substantially real-time computing operation is initiated based at least partially on the first signal, determining, using the one or more computing device processors, whether the first signal is registered with a signal server;

in response to determining the first signal is not registered with the signal server, transmitting, using the one or more computing device processors, to the first input signal system, a request for a registration of the first signal with the signal server;

receiving, using the one or more computing device processors, information associated with the request for the registration of the first signal with the signal server;

in response to receiving the information associated with the request for the registration of the first signal with the signal server, establishing, using the one or more computing device processors, the registration of the first signal with a signal server;

in response to establishing the registration of the first signal with the signal server, associating, using the one or more computing device processors, a movable matching signal with the first signal, wherein the movable matching signal is not associated with a second signal;

determining, using the one or more computing device processors, a second substantially real-time computing operation is initiated, based at least partially on the first signal, at a second input signal system comprising a second substantially real-time sensor;

in response to determining the second substantially real-time computing operation is initiated based at least partially on the first signal, determining, using the one or more computing device processors, whether the movable matching signal is associated with the first signal;

in response to determining the movable matching signal is associated with the first signal, executing, using the one or more computing device processors, the second substantially real-time computing operation based at least partially on at least one of the movable matching signal and the first signal;

determining, using the one or more computing device processors, during or after the execution of the second substantially real-time computing operation, whether an attribute associated with the movable matching signal is extinguished;

in response to determining, during or after the execution of the second substantially real-time computing operation, the attribute associated with the movable matching signal is extinguished, disassociating, using the one or more computing device processors, the movable matching signal from the first signal;

determining, using the one or more computing device processors, a third substantially real-time computing operation is initiated based at least partially on the second signal at a third input signal system comprising a third substantially real-time sensor;

in response to determining the third substantially real-time computing operation is initiated based at least partially on the second signal, determining, using the one or more computing device processors, whether the movable matching signal is associated with the second signal; and in response to determining the movable matching signal is not associated with the second signal, executing, using the one or more computing device processors, the third substantially real-time computing operation based at least partially on the second signal, and not based on the movable matching signal, wherein the first signal and the second signal are storable.

12. The method of claim 11, wherein the request for the registration of the first signal with the signal server transmitted to the first input signal system is further based on a location of the first input signal system or on an attribute of the first signal.

13. The method of claim 11, wherein the first input signal system, the second input signal system, or the third input signal system comprises or is comprised in a mobile computing system or a non-mobile computing system.

14. The method of claim 11, wherein the first signal, or an identification signal associated with the first signal, is associated with or comprises a first computing token.

15. The method of claim 11, wherein the first signal or the second signal is tokenized, or wherein a computing token is generated or extracted from at least a portion of the first signal or the second signal.

16. The method of claim 11, wherein the first signal is tokenized at the first input signal system.

17. The method of claim 11, wherein the first signal comprises an identification signal and a computing operation signal, wherein the identification signal is transmitted from the first input signal system on a first signal path to a first server for execution by the first server, and wherein the computing operation signal is transmitted from the first input signal system on a second signal path to a second server for execution by the second server.

18. The method of claim 17, wherein the execution of the computing operation signal by the second server occurs after the execution of the first signal by the first server.

19. The method of claim 17, wherein the execution of the computing operation signal by the second server is based on the execution of the first signal by the first server.

20. The method of claim 19, wherein the one or more computing device processors are comprised in the first server, and wherein the first server is remote to the first input signal system, the second input signal system, and the third input signal system.

* * * * *